Oct. 24, 1967 O. CONWAY 3,349,178
FACSIMILE RECORDER PHASING APPARATUS UTILIZING A HYSTERESIS SYNCHRONOUS MOTOR WITH MEANS FOR VARYING THE EFFECTIVE IMPEDANCE OF ONE WINDING TO EFFECT SYNCHRONIZATION
Filed April 10, 1964
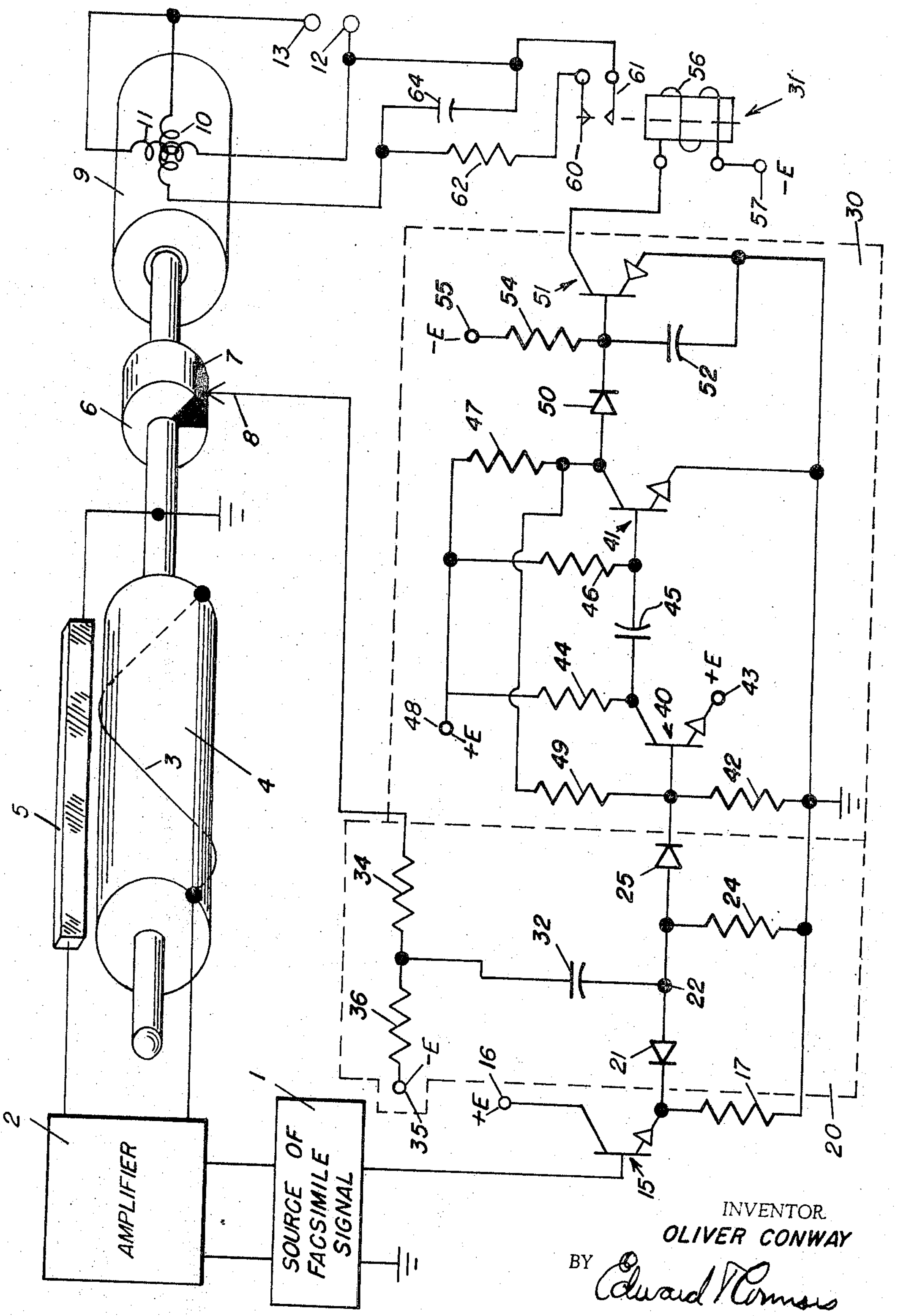
INVENTOR
OLIVER CONWAY
BY Edward V. Connors United States Patent Office 3,349,178

Patented Oct. 24, 1967

3,349,178
FACSIMILE RECORDER PHASING APPARATUS UTILIZING A HYSTERESIS SYNCHRONOUS MOTOR WITH MEANS FOR VARYING THE EFFECTIVE IMPEDANCE OF ONE WINDING TO EFFECT SYNCHRONIZATION

Oliver Conway, Los Angeles, Calif., assignor to Hogan Faximile Corporation, New York, N.Y.

Filed Apr. 10, 1964, Ser. No. 358,845
7 Claims. (Cl. 178—69.5)

The present invention relates to facsimile systems, and more particularly to automatic phasing apparatus for a facsimile recorder.

In electric facsimile systems graphic material such as pictures, drawings, printed or typed material, or the like, is scanned and the information is converted into electric facsimile signals which are used either locally or remotely to produce a recorded "facsimile" of the original or subject copy.

In a typical facsimile transmitter subject copy is continuously moved past a scanning area where it is illuminated and its image is focused on a scanner which converts the scanned information into a series of trains of electric video signals, each corresponding to a line of the subject copy and each starting at the left hand margin of the subject copy and terminating at the right hand margin thereof. A so called "backstroke interval" is provided between each train of electric video signals for the transmission of phasing or other signals.

In a typical facsimile recorder means are provided by which an electrolytic recording medium from a supply roll is continuously moved between a fixed linear electrode and a helical electrode which is rotatably carried by a drum. The recording is made by the passage of the electric video signals through the recording medium.

The signal input to the receiver is the series of trains of electric video signals sent by the transmitter together with the phasing pulse transmitted during the backstroke interval and which is separated at the receiver to control phasing apparatus. The phasing apparatus is used to properly phase the recorded copy responsive to the transmitted phasing pulses. Proper phasing is accomplished when the received video signal for each line of scan is recorded starting at the left hand margin of the recording medium.

The phasing apparatus includes motor driving means and control means for the motor for varying the angular position of its rotor so that the helical electrode driven thereby rotates in phase position with the transmitter.

Heretofore, means has been provided for controlling the phase of the recorder motor. Such means is disclosed in U.S. Patent No. 2,630,494 issued to J. W. Smith on March 3, 1953, and titled Automatic Phasing Circuit for Facsimile Circuits. In this patent an electric circuit is utilized to detect lack of phase relationship and to momentarily interrupt the power supply with the result that the motor slips back a pole. Each succeeding phasing pulse causes the motor to slip back until the proper phase position is obtained. While the Smith phasing means has been generally satisfactory it is subject to the inherent disadvantage that the motor circuit is opened to obtain the pole slipping action. The result is a rough operation of the motor.

The present invention aims to overcome the difficulties or disadvantages of prior devices by providing phasing apparatus which is smooth in operation and fast in operation.

In accordance with the invention this is accomplished by providing a facsimile recorder phasing apparatus incorporating a split phase hysteresis motor with means for changing the effective impedance of one of the windings of said motor so that the motor slows below synchronous speed for a controlled period until it is in phase with transmitted phasing pulses.

Other objects and advantages of the invention will be apparent from the following description and from the accompanying drawing which shows, by way of example, an embodiment of the invention.

In the drawing there is shown a schematic diagram of a construction in accordance with the invention.

Referring to the drawing there is shown a source 1 of facsimile signals, which may be a facsimile receiver, having dual outputs, one of which is applied to an amplifier 2. The amplifier 2 supplies a helix electrode 3 carried by a drum 4 and a linear electrode 5, positioned adjacent the helix 3. Electrolytic recording paper is passed between the electrodes 3 and 5 and marked as is known in the art.

Suitable rotary switching means such as a keyer disc 6 having a grounded segment 7 is rotated with the drum 4. A brush 8 contacts the disc 6 and its grounded segment 7. The drum 4 and the keyer disc 6 are driven by a split phase hysteresis motor 9 which has windings 10 and 11, a suitable power supply being connected to terminals 12 and 13. Alternatively the rotary switching means may be a reed type switch controlled by a magnet rotatably carried with the drum as known in the art.

The source of facsimile signals 1 includes pulse stripping means so as to produce a second output which is a series of phasing pulses. The phasing pulses from the source 1 are applied to base of a NPN transistor 15. The collector may be connected to a suitable source of positive biasing potential 16 such as plus ten to twelve volts. The emitter of transistor 15 is connected through a load resistor 17 to ground, to a coincidence network 20, and to the cathode of a diode 21 having its anode connected to junction point 22 of the coincidence network 20. A discharge resistor 24 is connected between ground and the junction point 22 and to the anode of a diode 25 having its cathode connected to an amplifier 30 for operating a relay 31.

The junction point 22 is also connected through a capacitance 32 and a resistance 34 to the brush 8. A negative potential 35 of about ten volts is connected to the capacitance 32 through a resistance 36. The coincidence circuit 20 is described in a copending application Ser. No. 199,187 filed May 31, 1962 by John W. Smith and titled Facsimile Coincidence Phasing Control Circuit.

The amplifier 30 includes a pair of NPN transistors 40 and 41 connected in a grounded emitter circuit. The output of the coincidence circuit 20 is connected to the base of transistor 40 together with a resistor 42 connected to ground to set the operating level. The collector of transistor 40 is connected through a resistor 44 to a positive supply of about ten volts, and its emitter is connected to a positive supply 43 of about five volts to provide a threshold. The output of the transistor 40 is connected through a capacitor 45 to the base of the transistor 41, the base being biased by a connection through a resistor 46 to a positive supply 48 of about ten volts and the emitter being grounded. A feedback loop is connected from the collector of transistor 41 through resistor 49 to the base of transistor 40.

The output of transistor 41 is connected to the anode of a diode 50 having its cathode connected to the base of a PNP transistor 51, the base also being connected through a capacitance 52 to ground and through a resistor 54 to a negative supply 55 of about ten volts. The emitter of transistor 51 is grounded and its collector is connected through relay coil 56 of relay 31 to a negative supply 57 of about twenty-four volts.

Relay switch contacts 60 and 61 are connected in series with a resistance 62 across capacitance 64 which is connected in series with the capacitance winding 10 of the motor 9.

In the operation of the circuit, a series of phasing pulses are supplied from the source 1 to the base of transistor 15 and the load resistor 17 for amplification and supply to the diode 21. Meanwhile the capacitor 32 is being charged to a negative potential by the source 35 through the resistor 36. Simultaneously the keyer disc 6 is being rotated with the helix 3, and upon contact of the brush 8 with the grounded segment 7 the potential of the capacitance 32 is dropped causing it to discharge through the diode 21 and the load resistor 17 to ground or through the discharge resistor 24 to ground. Inasmuch as the load resistor 17 is of the order of one hundredth of the resistance of the discharge resistor 24, the capacitance 32 will tend to discharge through the load resistor 17 and the pulse produced at the junction 22 will be of the order of one volt as most of the voltage drop will be across the resistor 34. However, in the event the source of phasing signals is producing a pulse across the load resistor 17 at the same time as the capacitance 32 is discharged, the potential across the load resistor 17 will be such as to block current from the capacitor 32 thereby forcing it to discharge through the discharge resistor 24 and causing a large pulse of the order of ten volts to be produced at the junction point 22 which is of sufficient magnitude to overcome a threshold of about five volts of the diode 25. By this means a coincidence pulse is applied through the amplifier 30 to the relay 31, holding the relay contacts 60 and 61 in the open position so as to cut the resistor 62 out of the circuit and allow the motor 9 to operate at synchronous speed.

In the event the recorder is out of phase with the source of phasing pulses, no coincidence pulse is provided and the relay contacts 60 and 61 are closed until the motor 9 slips enough to bring the helix 3 into proper phase position.

Alternatively a construction may be used in which the relay 31 is replaced by a semiconductor switch such as the Triac manufactured by the General Electric Company.

The motor 9 is a synchronous motor which uses magnetic hystersis to produce torque. The rotor of the motor 9 is a simple smooth nonsalient ring of permanent magnet material. The stator, to produce a rotating field, has a pair of windings 10 and 11, the winding 10 having a capacitor 64 in series therewith. The current in main winding 11 lags the current in the capacitor 10 by approximately ninety degrees. Two pulsating magnetic fields are produced which combine to form a magnetic field which rotates around the air gap at synchronous speed. The rotating magnetic field induces magnetic poles of opposite polarity in the rotor. As the rotating stator field slips past the rotor, the rotor tends to retain its polarity of magnetization particularly as it is made of permanent magnet type material. The constant torque accelerates the rotor until it eventually pulls into synchronism with the rotating stator field.

The hysteresis motor 9 differs from the salient pole motor in that it does not have to snap into synchronism, further, it will pull into synchronism any load that it is capable of accelerating. There is no hunting by the hysteresis motor as it reaches synchronization.

In the event the motor 9 is in synchronous operation but the helix 3 is being rotated out of phase with the transmitter, it is necessary to cause the motor to slip. Nonsynchronous operation of the motor 9 is caused by changing the power factor of the current in one of the windings so that its rotating field is weakened. This may be done by changing the impedance of one of the windings and is most conveniently done by connecting a resistance in parallel with the phase shifting capacitance 64. Although the motor 9 loses synchronous speed, it still retains considerable torque and is able to very quickly and smoothly regain synchronous speed when the resistance is cut out of the circuit.

In the phasing operation, the optimum slippage rate is dependent upon the required positional accuracy of recorded line which should be within five percent or within .45 inch for a nine inch scan.

The salient pole slipping motors of the prior art when using a two pole 60 cycle motor geared down for a 900 r.p.m. recording, had a minimum positional tolerance of 1.37 inches. With the hystersis motor it is possible to obtain a positional tolerance limited only by the recognition time required by the coincidence circuit. In a practical construction, the positional tolerance of the phased point for a nine inch scan is usually kept below .5 inch.

In using the hysteresis motor slippage control means, as taught herein, a very smooth, accurate, and reproducible phasing operation is had because constant slippage rate is achieved which is readily adjustable as desired by varying the amount of impedance.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

I claim:

1. A facsimile recorder phasing apparatus including coincidence phasing circuit means, a split phase hysteresis motor including two windings, impedance means for varying the effective impedance of one winding of said split phase motor, and switching means controlled by said coincidence phasing circuit means for rendering said impedance ineffective.

2. A facsimile recorder phasing apparatus including a motor driving the mechanical parts thereof, the recorder including a coincidence circuit having dual inputs one of which is receptive to transmitter phasing pulses the other input receptive to local phasing pulses and the output providing a control, the improvement wherein the motor is of the hysteresis type provided with split phase windings including a capacitance in one winding, and an impedance and switching means are connected in series across the capacitance, the switching means controlled by the output of the coincidence circuit to connect and disconnect the impedance across the capacitance.

3. A facsimile recorder phasing apparatus including a motor driving the mechanical parts thereof, the recorder including a coincidence circuit having dual inputs one of which is receptive to transmitter phasing pulses the other input receptive to local phasing pulses and the output providing a control, the improvement wherein the motor is of the hysteresis type provided with split phase windings including a capacitance in one winding, and an impedance and a relay are connected in series across the capacitance, the relay controlled by the output of the coincidence circuit to connect and disconnect the impedance across the capacitance.

4. A facsimile recorder phasing apparatus including a motor driving the mechanical parts thereof, the recorder including a coincidence circuit having dual inputs one of which is receptive to transmitter phasing pulses the other input receptive to local phasing pulses and the output providing a control, the improvement wherein the motor is of the hysteresis type provided with split phase windings including a capacitance in one winding, and a resistance and switching means are connected in series across the capacitance, the switching means controlled by the output of the coincidence circuit to connect and disconnect the resistance across the capacitance.

5. A facsimile recorder phasing apparatus including a motor driving the mechanical parts thereof, the recorder including a coincidence circuit having dual inputs one of which is receptive to transmitter phasing pulses the other input receptive to local phasing pulses and the output providing a control, the improvement wherein the motor is of the hysteresis type provided with split phase windings including a capacitance in one winding, and a resistance and a relay are connected in series across the capacitance, the relay controlled by the output of the coincidence circuit to connect and disconnect the resistance across the capacitance.

6. A facsimile recorder phasing apparatus including a motor driving the mechanical parts thereof, the recorder including a coincidence circuit having dual inputs one of which is receptive to transmitter phasing pulses the other input receptive to local phasing pulses and the output providing a control, the improvement wherein the motor is of the hysteresis type providing with split phase windings including a capacitance in one winding, and an impedance and semiconductor switching means are connected in series across the capacitance, the semiconductor switching means controlled by the output of the coincidence circuit to connect and disconnect the impedance across the capacitance.

7. A facsimile recorder phasing apparatus including a motor driving the mechanical parts thereof, the recorder including a coincidence circuit having dual inputs one of which is receptive to transmitter phasing pulses the other input receptive to local phasing pulses and the output providing a control, the improvement wherein the motor is provided with a split phase winding including a capacitance in one winding, and a resistance and switching means are connected in series across the capacitance, the switching means normally open, the output of the coincidence circuit effective to close the switching means in the absence of coincidence of the transmitter and local pulses.

References Cited

UNITED STATES PATENTS

| | | | |
|---|---|---|---|
| 2,367,975 | 1/1945 | Sullivan et al. | 318—314 X |
| 2,586,095 | 2/1952 | Roters | 328—166 |
| 2,689,273 | 9/1954 | Ridings et al. | 178—69.5 |

JOHN W. CALDWELL, *Acting Primary Examiner.*

R. L. RICHARDSON, *Assistant Examiner.*